(12) United States Patent
Chandrapal

(10) Patent No.: US 8,891,524 B2
(45) Date of Patent: Nov. 18, 2014

(54) METHOD AND APPARATUS OF AUTOMATICALLY PROVIDING REGISTRATION INFORMATION

(75) Inventor: Sarayu Srinivas Chandrapal, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2454 days.

(21) Appl. No.: 11/477,853

(22) Filed: Jun. 30, 2006

(65) Prior Publication Data
US 2008/0002700 A1    Jan. 3, 2008

(51) Int. Cl.
*H04L 12/28* (2006.01)
*G06F 15/16* (2006.01)
*H04L 12/24* (2006.01)
*H04L 29/08* (2006.01)
*H04L 29/06* (2006.01)

(52) U.S. Cl.
CPC ........... *H04L 41/0266* (2013.01); *H04L 67/325* (2013.01); *H04L 41/0273* (2013.01); *H04L 67/125* (2013.01); *H04L 69/08* (2013.01); *H04L 41/22* (2013.01); *H04L 41/12* (2013.01)

USPC ............................ 370/392; 709/203; 709/219

(58) Field of Classification Search
None
See application file for complete search history.

(56) References Cited

U.S. PATENT DOCUMENTS

| | | | |
|---|---|---|---|
| 6,208,853 B1* | 3/2001 | LoVasco et al. | 455/414.1 |
| 7,454,366 B2* | 11/2008 | Kato | 705/21 |
| 2003/0074230 A1* | 4/2003 | Merkin et al. | 705/4 |
| 2003/0074294 A1* | 4/2003 | Merkin et al. | 705/36 |
| 2004/0111476 A1* | 6/2004 | Trossen et al. | 709/206 |
| 2004/0148598 A1* | 7/2004 | Kita et al. | 717/170 |
| 2006/0089987 A1* | 4/2006 | Igarashi et al. | 709/225 |
| 2006/0253852 A1* | 11/2006 | Honda et al. | 717/177 |
| 2006/0259976 A1* | 11/2006 | Thompson et al. | 726/26 |

* cited by examiner

*Primary Examiner* — Suk Jin Kang

(57) ABSTRACT

An apparatus for, and method of, automatically providing network device warranty data to a destination process operating on a server remote from the apparatus are described. A process may comprise authorizing a source process to automatically upload warranty data to the destination process. The source process is then operable, on an automatic basis, to integrate device data stored in a first format into a standard format and transfer the integrated data to the destination process.

8 Claims, 4 Drawing Sheets

METHOD AND APPARATUS OF AUTOMATICALLY PROVIDING REGISTRATION INFORMATION

BACKGROUND

A computer network may comprise two or more interconnected devices, each with its own specific serial number, model number, hardware and/or software versions and device warranty information. Because of the sheer number of network devices that may comprise a network, network management software is often used to both troubleshoot network problems and manage the network configuration.

DESCRIPTION OF THE DRAWINGS

The present embodiment is illustrated by way of example, and not by limitation, in the figures of the accompanying drawings, wherein elements having the same reference numeral designations represent like elements throughout and wherein.

DETAILED DESCRIPTION

Figure 1:
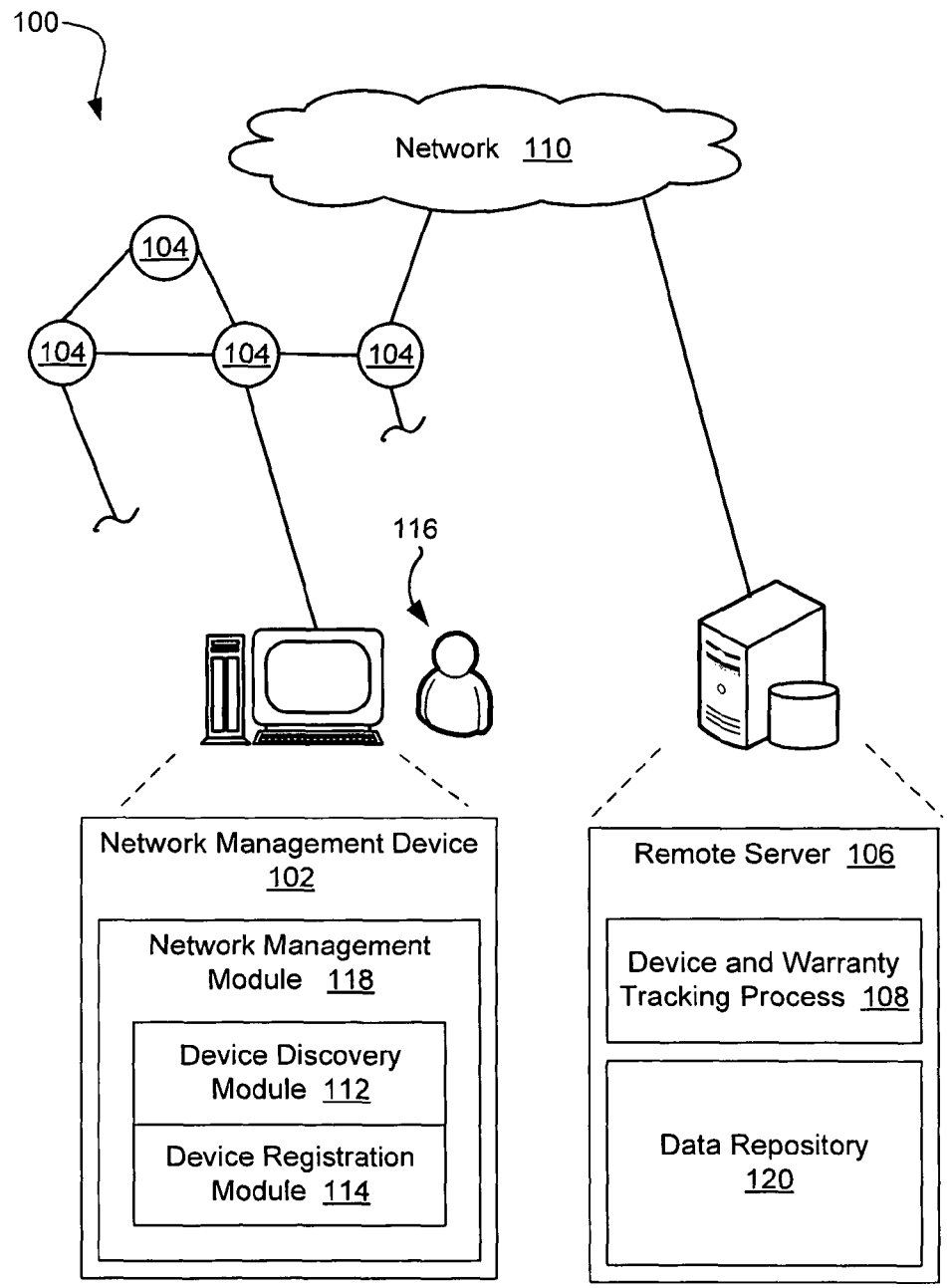
FIG. 1 is a high level network diagram illustrating a computer network including a network management device according to an embodiment.

FIG. 1 illustrates a system 100 comprising apparatus and methods for automatically forwarding, across network 110, registration information for one or more devices 104 on the network 110 from a (network) management device 102 to a remote data repository 120 on remote server 106. Based upon the uploaded information, the remote server 106 is operable to provide a user 116 of network management device 102 with features such as inventory tracking, device warranty information, and software update notification information pertaining to the network devices in the managed network or sub-network.

Network management device 102 may comprise a network management module 118 that may comprise multiple software modules. An authorized user may register the software online via a web process running on remote server 106. The network management module 118 may comprise a device discovery module 112, to discover managed devices on the network. Network management module 118 gathers device specific information pertaining to the discovered devices locally, on the network management device 102.

The network management module 118 may further comprise a device registration module 114, operable to automatically upload the locally stored device registration information to a warranty tracking module 108 hosted on remote server 106. For validation purposes, the device registration module 114 may require the exchange of user login information. Furthermore, to configure the device registration module to upload the locally stored device registration information on an automatic basis, user supplied reporting parameters may be requested of authorized user 116.

Remote server 106 (or plurality of servers) comprise at least one of any type of server, personal computer, mini computer, mainframe computer, or any computing device either special purpose or general computing device. Further, there can be separate servers or computer devices associated with Remote server 106 that work in concert to provide data in usable formats to parties, and/or to provide a separate layer of control in the data flow between the network management device 102 and remote server 106.

Remote server 106 may further comprise device and warranty tracking process 108 including software, hardware, data, and generally any executable instructions operable to manage the collection and presentation of data uploaded from at least one network management device 102, including inventory tracking, device warranty information, and software update notification information pertaining to the network devices in the user's managed network or sub-network.

Remote server 106 may further comprise data repository 120 for storing the warranty data received from a network management device 102 and may comprise any type of memory or storage device.

Network 110 may further comprise any communications network operable, at least in part, for enabling communication between the network devices 104 shown on FIG. 1, as well as any other device connected to the network 110. Network 110 may comprise at least one, or any combination, of: a wired and/or wireless network; a shared wireless access protocol (SWAP) network; a wideband network, such as a wireless Ethernet compatibility alliance (WECA) network, a 802.xx network; a public switched telephone network; a public heterogeneous communications network, such as the Internet; a private communications network; a land mobile radio network; and other networks.

While network management device 102 may be physically attached to network device 104, it is to be understood that the administrator device may be connected anywhere within network 110, provided that communication between the administrator device, network device 104, and remote server 106 is enabled. Furthermore, although device registration module 114 may comprise a separate module within network management module 118, in other embodiments, the device registration module may be integrated within the device discovery module 112 or installed in the memory of any applicable device on network 110, provided the device registration module has access to the device discovery module and associated data.

Figure 2:
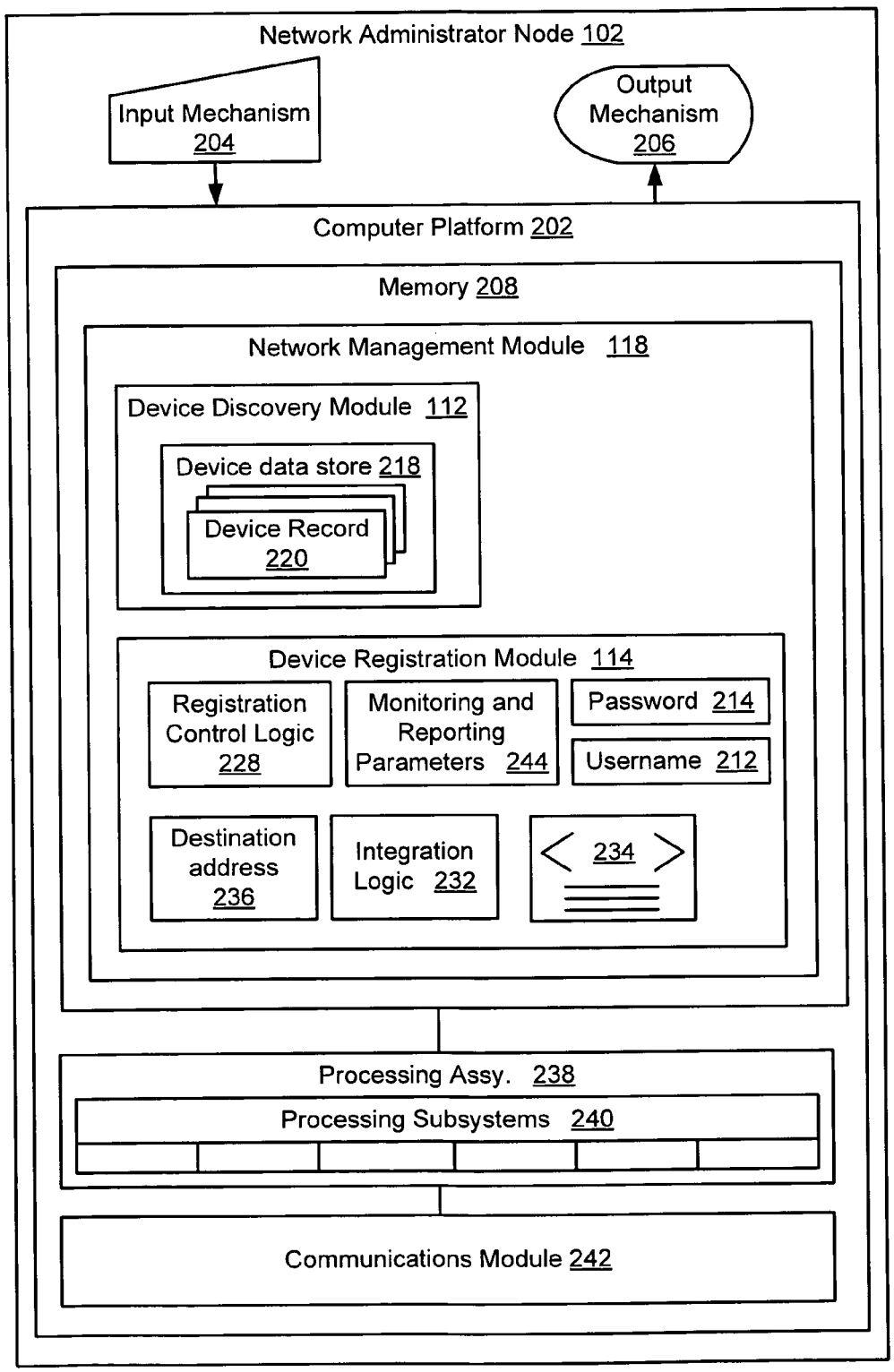
FIG. 2 is a block diagram of a network management device according to FIG. 1.

Referring now to FIG. 2, network management device 102 may comprise any type of processing device having a connection to network 110. Network management device 102 may further comprise a computer platform 202 having an input mechanism 204 and an output mechanism 206. Input mechanism 204 may comprise, but is not limited to, a mechanism such as a key or keyboard, a mouse, a touch-screen display, and/or a voice recognition module, etc. Output mechanism 206 may comprise, but is not limited to, a display, an audio speaker, and a haptic feedback mechanism, etc.

Computer platform 202 may also comprise a memory 208, which may comprise volatile and/or nonvolatile memory such as a read-only and/or a random-access memory (ROM and RAM), EPROM, EEPROM, flash cards, or a memory readable and/or writable by a processing device. Further, memory 208 may comprise one or more flash memory cells, or may comprise any secondary or tertiary storage device, such as magnetic media, optical media, tape, or soft or hard disk.

Network management device 102 may further comprise processor assembly 238, which may further comprise an application-specific integrated circuit ("ASIC"), or other chipset, processor, logic circuit, registers, and/or other data processing device operable to execute instructions making up device registration module 114.

Additionally, processor assembly 238 may comprise one or a combination of processing subsystems 240 that perform specific operations and/or provide specific functionality required by network management device 102. In one aspect, processing subsystems 240 may comprise subsystems such as: sound, non-volatile memory, file system, transmit, receive, network handling components, e.g., layer 1, layer 2, layer 3, secure socket layer (SSL), main control, remote procedure, power management, diagnostics, digital signal processor, messaging, user interface, sleep, data services, security, authentication, graphics, universal serial bus (USB), multimedia such as Moving Picture Experts Group (MPEG), etc.

Furthermore, computer platform 202 may comprise a communications module 242 embodied in hardware, software, and/or combinations thereof, operable to receive/transmit and otherwise enable communication between components internal to network management device 102, e.g., device discovery module 112 and device registration module 114, as well as, to enable communication between the network management device and other devices, e.g., network devices 104 and remote server 106.

Memory 208 may comprise a network management module 118 operable to perform network management functions for managed devices 104, for example, PROCURVE NETWORK MANAGER, available from Hewlett-Packard Co., of Palo Alto, Calif. The network management module 118 may comprise device a discovery module 112 operable to discover managed network devices 104 and store data elements, specific to the discovered device, in a device record 220. Data elements may comprise device warranty information such as: MAC address information, hardware and/or software versions, model number, and serial number. The device data record 220 may be stored in any format, including known databases such as MYSQL, ORACLE, etc.

Computer platform 202 may further comprise device registration module 114 that may comprise software components operable to extract device information from device data store 218, integrate the data in a format that may transferred via an Internet protocol to the device and warranty tracking process 108 on remote server 106.

Device registration module 114 may be loaded in memory 208 via various techniques, including, but not limited to, removable media and communication with a network server. Furthermore, the device registration module may be loaded with device discovery module 112 as part of network management module 118.

Device registration module 114 may further comprise registration control logic 228 operable to control all functions of network management module 118. Warranty information extracted from the device discovery module 112 may comprise model number, serial number, MAC address, and hardware and/or software versions of network-connected devices managed by the device discovery module. Device registration module 114 may further comprise a graphic user interface (GUI) 216 to facilitate the collection of user supplied information that may comprise configurable reporting parameters 244, including, but not limited to schedule information as to when device warranty information is extracted and uploaded. The device registration module 114 may further comprise a graphic user interface (GUI) 216 operable by user 116 to register the network management module 118, to facilitate troubleshooting, and to perform other network related functions. Furthermore, GUI 216 is operable to permit a user to enter login information, e.g., username and password data, into fields 212 and 214, respectively.

Registration control logic 228, responsive to reporting parameters 244 and a timer-based process, is operable to control integrating device warranty information into a file 234 and transferring the file to remote server 106. File 234 may, for example, be created and uploaded to server 106 based upon a user determined schedule, e.g., weekly, or based upon a predetermined event such as changes to the managed network triggered by device discovery module 112. Furthermore, the creation of file 234 and transfer of the file may be based upon separate reporting parameters. For example, although integrated file 234 may be created upon discovery of a new network device, registration control logic 228 may wait until communication traffic on network 110 is below a predetermined network traffic threshold value in order to transfer file 234 to remote server 106. For example, control logic 228 may wait until a period of low network traffic to upload file 234 to remote server 106.

Furthermore, additional parameters making up reporting parameters 244 may control the amount of data to be uploaded. For example, in some embodiments, data for all devices may be uploaded weekly, whether or not there have been any changes to the managed network. In other embodiments, only certain device records 220, e.g., additions, deletions, and changes, may be selected to be uploaded to device and warranty tracking process 108, thereby reducing the size of file 236 and the time required to transmit the data.

Device registration module 114 is operable to securely transmit file 234 to remote server 106 over network 110, for example, via a secure internet connection, e.g., HTTPS. Upon receiving file 234, remote server 106 may be operable to store the data in a format other than that of data store 218. For example, PROCURVE NETWORK MANAGER may utilize a MYSQL-based data store to store device information while the device and warranty tracking process 108 may have implemented an ORACLE-based database. The transfer of data between processes with disparate data formats may require converting device data store 218 to a data file having a format both applications, device registration module 114 and device and warranty tracking process 108, understand, for example, an XML file format.

An XML file (as well as its component parts) is defined according to a predefined "schema" and both the schema and the integration logic may be embodied in integration logic 232. An XML schema consists of two parts: a type specification, e.g., a Document Type Definition (DTD) and a set of integrity constraints. Accordingly, integration logic 232 is operable to ensure that XML file 234 conforms to the schema type and satisfies the constraints. In some embodiments, the schema may be downloaded from a network device, e.g., remote server 106.

Device and warranty tracking process 108 may be a self-describing, self-contained modular web service disposed on remote server 106. Device and warranty tracking process 108 may be accessed via Internet protocols and data formats, e.g., HTTP, HTTPS, and XML without concern regarding the implementation of the web service. Furthermore, communication between device registration module 114 and device and warranty tracking process 108 may be implemented using a protocol allowing applications to exchange information over HTTP/HTTPS, e.g., Simple Object Access Protocol (SOAP). SOAP is a protocol specification for invoking methods on servers, services components and objects that codifies the practice of using XML and HTTP as a method invoking mechanism permitting communication between applications operating on different operating systems, with different technologies and programming languages. In one embodiment, system 100 may implement SOAP as the interface to send and receive messages between device registration module 114 and a website hosting device and warranty tracking process 108.

Registration module 114 may, in combination with communications module 242, transmit a SOAP message to remote server 106. The SOAP message may comprise an ordinary XML document including an element identifying the XML document as a SOAP message, an optional header element comprising header information, and a body element comprising call and response information and encapsulating XML file 234 created by integration logic 232.

Although registration module 114 may be installed with destination address 236 preconfigured, i.e., with the address of remote server 106, the destination address is configurable and may be obtained from device registration module 114 or downloaded from a remote device, i.e., the remote server housing device and warranty tracking process 108.

Figure 3:
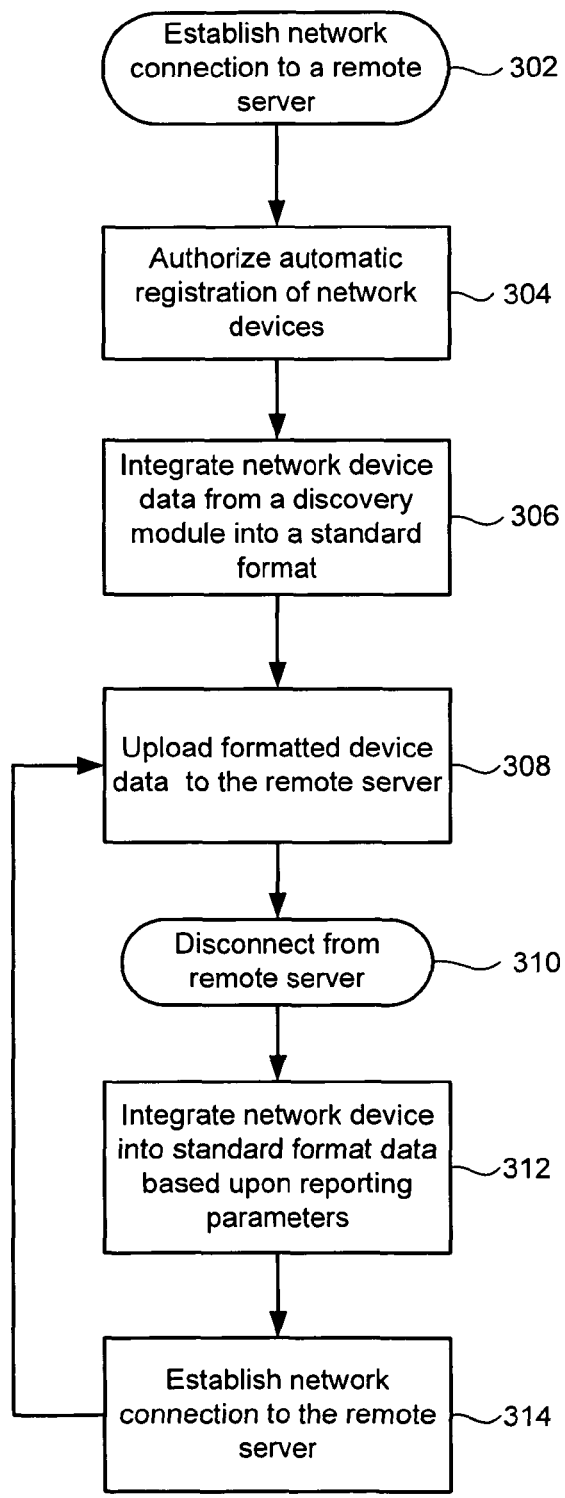
FIG. 3 illustrates an embodiment of a method of automatically uploading device information according to FIG. 1.

The flowchart of FIG. 3 illustrates a method by which an authorized user of a network management module 118, may, by operation of GUI 210 and device registration module 114, may automatically register, on a remote server 106, network devices discovered by a discovery module 112. User registration may be performed once, for example, at the time of registering the network management module 118. Subsequent automatic uploads of newly discovered device information may be performed automatically, on a user defined schedule, based upon configurable reporting parameters 244. Device data to be registered may comprise, but is not limited to hardware and/or software versions, model numbers, and MAC address information.

Registering the network management application, e.g., PROCURVE NETWORK MANAGER, may require establishing, at block 302, network connectivity with a web service mounted on remote server 106. The connection may be a secure Internet connection, and may, at block 304, comprise the exchange of username and password information that may be stored for subsequent use both at server 106 and in memory elements 212 and 214, respectively, of network management module 118. The user may at this time register their software implementing network management module 118 on the remote server 106.

Upon registering network management module 118, or upon authenticating user identity (user name and password) if registration has occurred at a previous time, remote server 106 may query user 116 as to whether the user wishes to automatically upload, to device and tracking process 108, warranty information for devices managed by device discovery module 112. In some embodiments, the remote server may initiate the query, in other embodiments, the network management module 118 may control the process and merely informs the remote server of the outcome. GUI 110 is operable to provide the man-machine interface between the user and the network management device 102.

Further, at block 304, the user may be required to enter reporting parameters 244, comprise scheduling information, e.g., day of week and time of day, and may further comprise a destination address 236 notifying the device registration module 114 as to the destination address of the transmitted data, e.g., device and warranty tracking process 108.

At block 306, under control of integration logic 232 and reporting parameters 244, a file including data integrated from device data store 218, e.g., a MYSQL-type database comprising device records 220, may be created at this time. As disclosed, the file created may be an XML document 234, wherein the integrated data elements may be configurable based upon an XML schema. Although the schema, comprising a DTD specification as well as a set of integrity constraints, may be maintained as part of integration logic 232, the schema may be obtained via various mechanisms, including loaded via electronic media, e.g., removable media, or may be downloaded from a network device, e.g. remote server 106.

Reporting parameters 244 are operable to allow the user to adjust the upload schedule of the discovered device information. For example, although an initial upload to remote server 106 may comprise data records 220 for all devices managed by discovery module 112, subsequent uploads may comprise only updates to the managed network. Furthermore, reporting parameters 244 may be operable to transmit file 234 daily, weekly, on a specific day, at a specific time, and upon a specific event, such as a change to the network as indicated by device discovery module 218.

At block 308, the integrated XML document may be transmitted, for example, via a secure Internet connection from network management device 102, to a web process, e.g., a device and warranty tracking process 108 hosted on remote server 106. An open extensible protocol, e.g., SOAP, may be employed to transfer integrated XML document 234 from device registration module 114, hosted by network management device 102, to device and warranty tracking process 108 mounted on the remote server 106. Accordingly, the XML document may be encapsulated within the body of a SOAP message.

Upon successful transfer of the data to device and warranty tracking process 108, device registration module 114 is operable to disconnect from remote server 106. At block 312, registration control logic 228, operating based upon reporting parameters 244, executes processes that notify control logic 228 when to recreate XML document 234. The notification may be initiated by a timing process based upon a reporting parameter 244, by device discovery module 112 that the managed network has been updated, or based upon registration control logic 228 determining that device data store 218 has been modified, e.g. via a change in file size, date modified, etc.

At block 314, registration control logic 228 may, based upon reporting parameters 244, reestablish a secure network connection with the device and warranty tracking process 108, exchanging login information, i.e., user and password information 212 and 214, respectively.

Upon successfully establishing an Internet connection, control may pass back to device registration module 114, at block 308, which is operable to transfer integrated XML document 234 created at block 312 to server 106. Blocks 308 through 314 may be repeated, based upon reporting parameters 244, and operate to automatically update device and warranty tracking process 108 with device data extracted from device discovery module 112. A user may then access the information stored in the remote information repository to further manage their network device.

Figure 4:
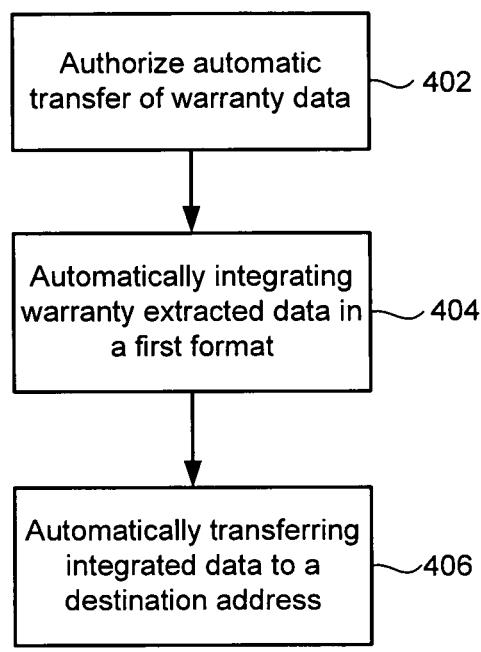
FIG. 4 illustrates an embodiment of a method of automatically uploading device information.

FIG. 4 shows a method of providing warranty data to a destination process at a remote server comprising an authorizing process 402 for authorizing an automatic transfer of warranty data from a source process to a destination process at a remote server. The method also comprises an integrating process 404 for automatically integrating the warranty data extracted by the source process, and as authorized by authorizing process 402, in a first format into a standard format and a transferring process 406 for automatically transferring the integrated data to a destination address at a user determined time.

The present embodiments disclose methods and apparatus which may be employed to transfer configuration and system information to a platform hosting an inventory tracking, device warrantee, and software update notification system. Registering a network management application and authorizing automatic storage of managed device information may initiate processes that automatically extract device information of devices belonging to the managed network.

The above described apparatus and methods for registering warranty information are disclosed in terms of embodiments based on automatic integration of device data into an XML formatted document and forwarding the integrated XML document to a remote server operable to perform inventory tracking, device warranty, and software update notification. Device information stored may comprise, but is not limited to, hardware and/or software versions, model numbers, and MAC address information. The data elements integrated and uploaded to device and warrantee tracking process 108 are configurable via appropriate modification of the XML schema maintained as part of integration logic 232. It should be understood, however, that the disclosed concept is not limited to a particular format for the source database or to particular type specifications or constraints for the XML schema.

What is claimed is:

1. A computer system, comprising a computer platform connected to a network, the computer platform including:
    a processor;
    a memory operatively connected with the processor;
    an output mechanism;
    a device discovery module resident in memory, the device discovery module operable, when executed by the processor, to:
    automatically discover a managed device connected to the network; and
    store device data specific to the discovered device in a device record, the device record stored in a first format; and
    a device registration module resident in memory, the device registration module operable, when executed by the processor, to:
    automatically extract the device data from the device record;
    integrate the extracted device data into a second format; and
    transfer the integrated data to a remote server on the network.

2. The computer system of claim 1, wherein the device discovery module includes a network management application operable to discover network-connected switching devices in the network.

3. The computer system of claim 1, wherein the device registration module further comprises user configurable reporting parameters, wherein the device registration module is operable, based upon the user configurable reporting parameters to integrate warranty data and transfer the integrated data to the destination address on a scheduled basis.

4. The computer system of claim 1, further comprising an input mechanism by which a user is able to enter authorization and reporting parameters.

5. The computer system of claim 1, wherein the remote server comprises a device and warranty tracking process operable to perform inventory tracking, device warranty, and software update notification.

6. The computer system of claim 1, wherein the first format is a database format.

7. The computer system of claim 1, wherein the device registration module is operable to transfer configuration and system information to a platform hosting an inventory tracking, device warrantee, and software update notification system.

8. The computer system of claim 1, wherein the second format is a markup language-based document based upon a schema.

* * * * *